No. 740,464. PATENTED OCT. 6, 1903.
S. L. PATTISON.
DRAFT EQUALIZER.
APPLICATION FILED OCT. 11, 1902.
NO MODEL.

Witnesses
Frank A. Sahle
J. A. Walsh

Inventor
Samuel L. Pattison
By
Bradford & Hood
Attorneys

THE NORRIS PETERS CO., PHOTO-LITHO., WASHINGTON, D. C.

No. 740,464.

Patented October 6, 1903.

UNITED STATES PATENT OFFICE.

SAMUEL L. PATTISON, OF INDIANAPOLIS, INDIANA.

DRAFT-EQUALIZER.

SPECIFICATION forming part of Letters Patent No. 740,464, dated October 6, 1903.

Application filed October 11, 1902. Serial No. 126,832. (No model.)

*To all whom it may concern:*

Be it known that I, SAMUEL L. PATTISON, a citizen of the United States, residing at Indianapolis, in the county of Marion and State of Indiana, have invented certain new and useful Improvements in Draft-Equalizers, of which the following is a specification.

The object of my invention is to provide a whiffletree which by slight and easily-produced changes in relative arrangement may serve as a draft device for two, three, or four horses.

The accompanying drawings illustrate my invention.

Figure 1:
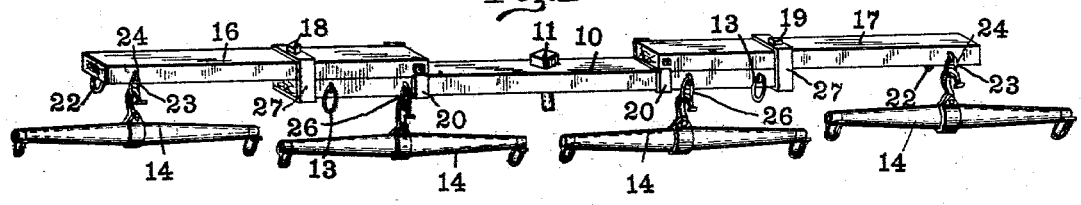
Figure 2:
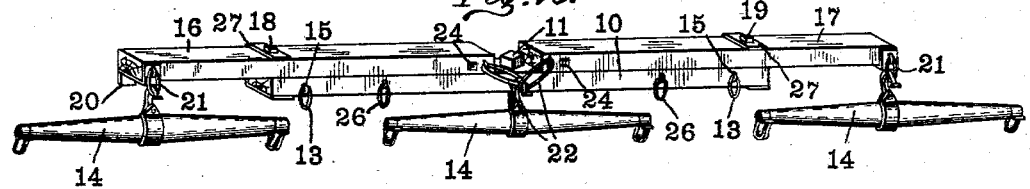
Figure 3:
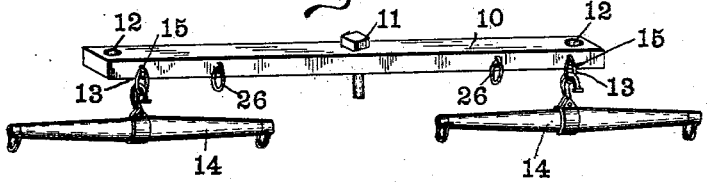
Figure 4:
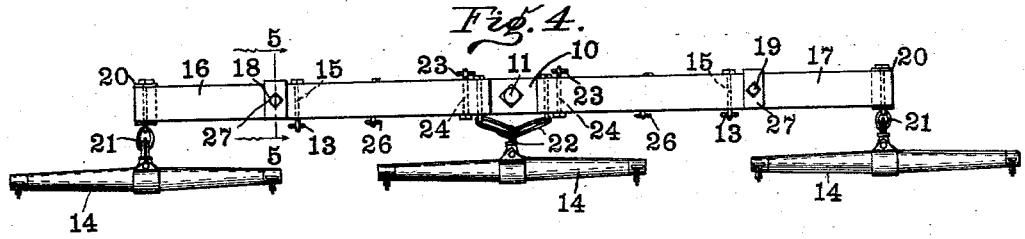
Figure 5:
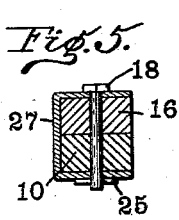
Figure 6:
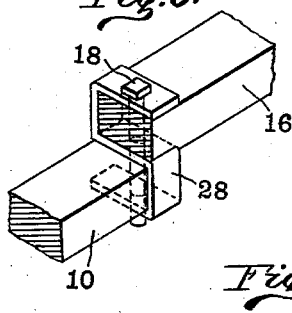
Figure 7:
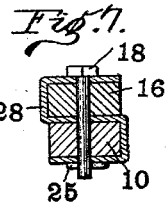
Figure 8:
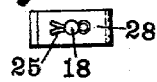

Figure 1 is a perspective view of my device with the parts arranged in position for the attachment of four horses; Fig. 2, a similar view with the parts in position for three horses; Fig. 3, a similar view of the main bar with the parts in position for two horses; Fig. 4, a plan view of the parts in the position shown in Fig. 2; Fig. 5, a section on line 5 5 of Fig. 4; Fig. 6, a perspective sectional detail of a modified form of clip; Fig. 7, a transverse section of the parts shown in Fig. 6, and Fig. 8 an under plan of the parts shown in Fig. 7.

In the drawings, 10 indicates the main bar of my device, which, as shown in Fig. 3, is capable of use as an ordinary doubletree. Bar 10 is perforated at the middle for the reception of the usual bolt 11 and is also provided at each end with perforations 12 12, the purpose of which will appear. Secured to each end of one vertical face of bar 10 is an eye 13, which eyes serve for the reception of any desired form of hook carried by any desired form of swingletree 14. For economy the eyes 13 are held in position by bolts 15, which pass through the main bar transversely. The two equalizing-bars 16 and 17 are perforated at a point substantially one-third of their length from one end to permit the passage of pins 18 and 19, respectively, which pins also pass through adjacent perforations 12, so as to pivot the equalizing-bars upon the ends of the main bar 10. Secured to the short arm of each of the equalizing-bars 16 and 17, substantially in line with the rear edge of said bars when the bars are in the three-horse position, as shown in Fig. 2, is a stop 20, and secured to the forward face of each of said short arms is a link 21, adapted to receive the hook of a swingletree 14. Projecting from the same face or edge of the long arms of each of the equalizer-bars is a link 22, the two of which may be brought together, so as to receive the hook of a swingletree 14, as shown in Fig. 2. Projecting from the opposite face of each of the equalizing-bars 16 and 17 of the long arm (the rear face when the bars are in the position shown in Fig. 2 and the forward face when the parts are in the position shown in Fig. 1) is an eye 23, held in position by a bolt 24, passing transversely through said long arms, and to this eye may be attached the hook of a whiffletree 14, as shown in Fig. 1. The pin 18 is removably held in position, preferably by means of a cotter-pin 25, so that the pin may be removed without the use of a wrench. Eyes 26 are secured to the forward face of bar 10 to receive the hooks of swingletrees 14, as shown in Fig. 1, for the four-horse rig.

In order to strengthen the parts, I provide a U-shaped clip 27, which embraces each equalizer-bar and the adjacent end of the main bar 10, the pin 19 passing through the arms thereof. Where greater strength is desired, I prefer to use the modified form of clip shown in Figs. 6 and 7. This modified form consists of an S-shaped clip 28, the middle of which lies between the two bars 10 and 16, the pin 18 passing through the three parallel arms of the S.

In operation suppose that a four-horse rig is desired. For this purpose the parts will be thrown into the position shown in Fig. 1, where the two equalizing-bars 16 and 17 have been swung upon the bolts 18 and 19, respectively, so as to project the long arms of said equalizer-bars out beyond the ends of the bar 10 and bring the stops 20 into engagement with the front face or edge of the main bar 10, said stops 20 thus preventing any further or forward turning of the long arms of the equalizer-bars on the main bar 10. The four swingletrees 14 are then attached, as shown, to the links 26 of the main bar 10 and to the links 23 of the long arms of the equalizer-bars 16 and 17, these several links being arranged equally in pairs upon opposite sides of the perforation through which bolt 11 passes. If a three-horse rig is desired, the several swingletrees are detached and the equalizer-bars 16 and 17 turned, the long arm swinging to the rear into the position shown in Fig. 2, where the long arms are projected inward and the short arms extended, the base of the U-shaped clip 27 swinging around the end of the main bar 10. In this position the two links 22 are brought together and the hook of one swingletree 14 passed therethrough, as clearly shown in Fig. 2, while two other swingletrees are attached to the links 21 of the short arms of the equalizer-bars. In this position the horse attached to the middle swingletree 14 pulls upon both of the longer arms of the equalizer-bars 16 and 17, while the outside horses pull upon the short arms of said equalizer-bars. It is to be noticed that the changes necessary to convert my device from a four-horse rig to a three-horse rig, and vice versa, consist merely in rearranging the swingletrees and swinging the two equalizer-arms upon the main arm and that no wrench or other tool is necessary. It is also to be noticed that in order to convert the rig into a common doubletree the equalizer-bars may be readily disconnected without the use of a wrench, for the cotter-pin 25 may be very quickly and easily withdrawn, so as to immediately free bolt 19, and thus allow the quick removal of the equalizer-bars. In such case the two swingletrees 14 are attached to the links 13. For heavy work the S-shaped clip 28 (shown in Figs. 6 and 7) is especially desirable, for in this case the pin 19 passes through the three parallel arms of the clip, one of said arms lying between a main bar 10 and the swinging equalizer-bar, thus preventing any splitting stress against the wood of the bars.

I claim as my invention—

1. A draft-equalizer consisting of a main bar, a pair of equalizer-bars pivoted thereto and rotatable thereon, whereby either end of each equalizer-bar may be projected beyond the end of the main bar, means for preventing swing of the equalizer-bar on the main bar in the direction of pull when one of its ends is extended, means for attaching draft mechanism to the main bar, and means for attaching the draft mechanism to the equalizer-bars in either position, for the purpose set forth.

2. A draft-equalizer consisting of a main bar, a pair of equalizer-bars pivoted thereto and rotatable thereon, whereby either end of each equalizer-bar may be projected beyond the end of the main bar, a stop-finger carried by one arm of each equalizer-bar to engage the main bar when in one position so as to prevent further turning thereof, means for attaching draft mechanism to the main bar, and means for attaching draft mechanism to each equalizer-bar in either position.

3. In a draft-equalizer, a main bar, an equalizer-bar, an S-shaped clip embracing the main bar and equalizer-bar with its middle between the two bars, and a pin passing through the two arms and the middle of said clip and through the equalizer-bar and main bar, whereby the equalizer-bar may make a half-revolution on the main bar.

4. As an article of manufacture for a draft-equalizer, an S-shaped clip for embracing the main bar and equalizer-bar thereof, said S-shaped clip having alined bolt-receiving perforations through its two ends and its middle, for the purpose set forth.

In witness whereof I have hereunto set my hand and seal, at Indianapolis, Indiana, this 3d day of October, A. D. 1902.

SAMUEL L. PATTISON. [L. S.]

Witnesses:
ARTHUR M. HOOD,
JAMES A. WALSH.